United States Patent
Audiffred et al.

[15] 3,673,799
[45] July 4, 1972

[54] TORQUE CONVERTER MODULATING PISTON

[72] Inventors: Sidney J. Audiffred, Washington; Lowell E. Johnson; Shairyl I. Pearce, both of East Peoria, all of Ill.

[73] Assignee: Caterpillar Tractor Co., Peoria, Ill.

[22] Filed: March 1, 1971

[21] Appl. No.: 119,503

[52] U.S. Cl. ................................................ 60/54
[51] Int. Cl. ........................... F16d 31/06, F16d 33/00
[58] Field of Search ........................................ 60/54

[56] References Cited

UNITED STATES PATENTS

| | | |
|---|---|---|
| 2,127,738 | 8/1938 | Kugel........................................60/54 |
| 2,580,072 | 12/1951 | Burnett......................................60/54 |
| 3,021,729 | 2/1962 | Chambers et al.........................74/768 |
| 3,091,976 | 6/1963 | Johnson et al............................74/364 |

Primary Examiner—Edgar W. Geoghegan
Attorney—Fryer, Tjensvold, Feix, Phillips & Lempio

[57] ABSTRACT

A torque converter used in combination with a multi-speed shiftable transmission is provided with control means which automatically reduces the torque transmitted by the converter at the moment of clutch engagement. The control means includes a dump valve which is responsive to the reduction in clutch engagement pressure to automatically discharge the pressure of the converter while in combination therewith a spoiler ring responsive to the same pressure drop is operative to effect a nearly complete slipping mode in the converter.

7 Claims, 5 Drawing Figures

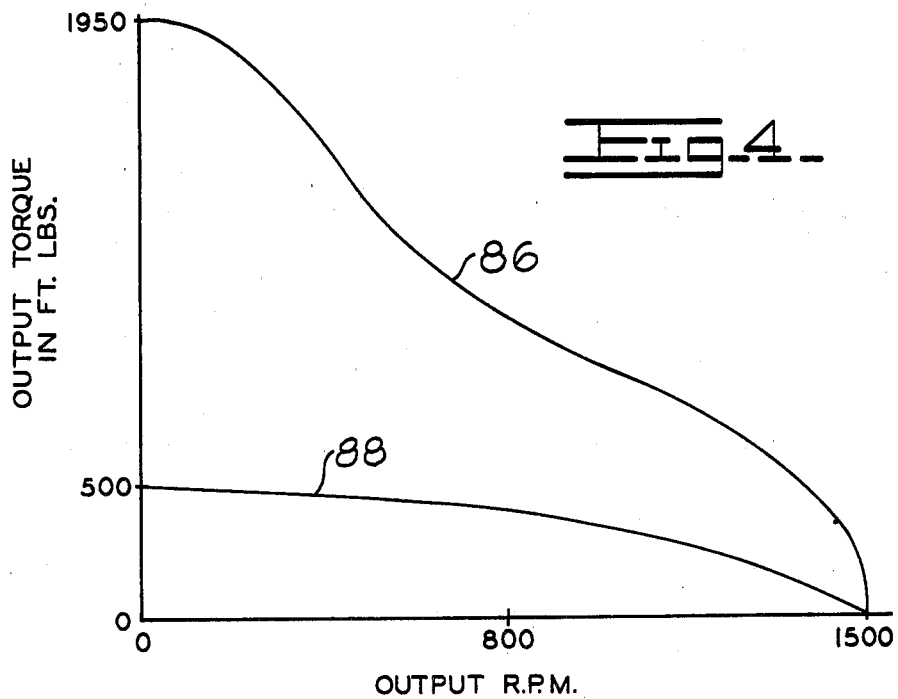
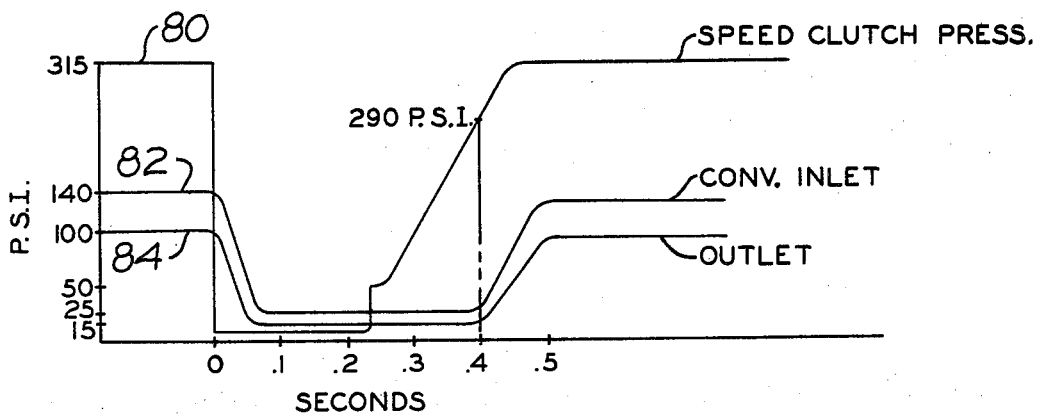

TORQUE CONVERTER MODULATING PISTON

BACKGROUND OF THE INVENTION

This invention relates to torque converters and pertains more particularly to control means for automatically reducing the torque transfer of the converter.

The clutch used in most transmissions which are combined with torque converters generally takes a severe beating due to torque loads which are transmitted through the converter during shifting. This torque results in an abrupt vehicle motion at the time of clutch engagement and a decrease in the life of the clutch. This problem is especially severe in heavy duty construction and earth moving equipment which undergo frequent directional shifts. Considerable effort has been expended in attempting to overcome this problem. Some systems have been constructed which have attempted to overcome this problem by relieving the converter of charging pressure at the time of the shift transient. Such systems have proven unsatisfactory because of the time necessary for relieving the pressure to have any effect on the torque transfer in the converter.

Other systems have proposed some means for reducing the pressure in the circulatory converter circuit. However, these earlier systems had generally a slow rate of response so that delays occurred during each shift before the converter absorbed full torque. Therefore these systems are unsatisfactory because of high energy losses induced within the system.

SUMMARY OF THE INVENTION

It is a primary object of the present invention to provide inexpensive and reliable means for overcoming the above objections to the prior art.

It is a further object of the present invention to provide automatic control means effective to automatically reduce torque transfers within a torque converter at the time of transmission shift.

A further object of the present invention is to provide means which is operative to effect a smoother transmission shift than has been heretofore known.

In accordance with the present invention a torque converter used in combination with a multispeed transmission is provided with control means automatically responsive to transmission shift to automatically reduce the torque through the converter by relieving the charging pressure of the converter and substantially simultaneously therewith blocking the circulatory flow within the converter.

BRIEF DESCRIPTIONS OF THE DRAWINGS

The above and other objects of the present invention will become apparent from the following description when read in conjunction with the accompanying drawings wherein:

FIG. 4 is a graphical representation showing the characteristics of the present invention where the output torque is plotted against output RPM; and, FIG. 5 is a graphical representation of various system pressures plotted against time.

DETAILED DESCRIPTION OF PREFERRED EMBODIMENT

Figure 1:
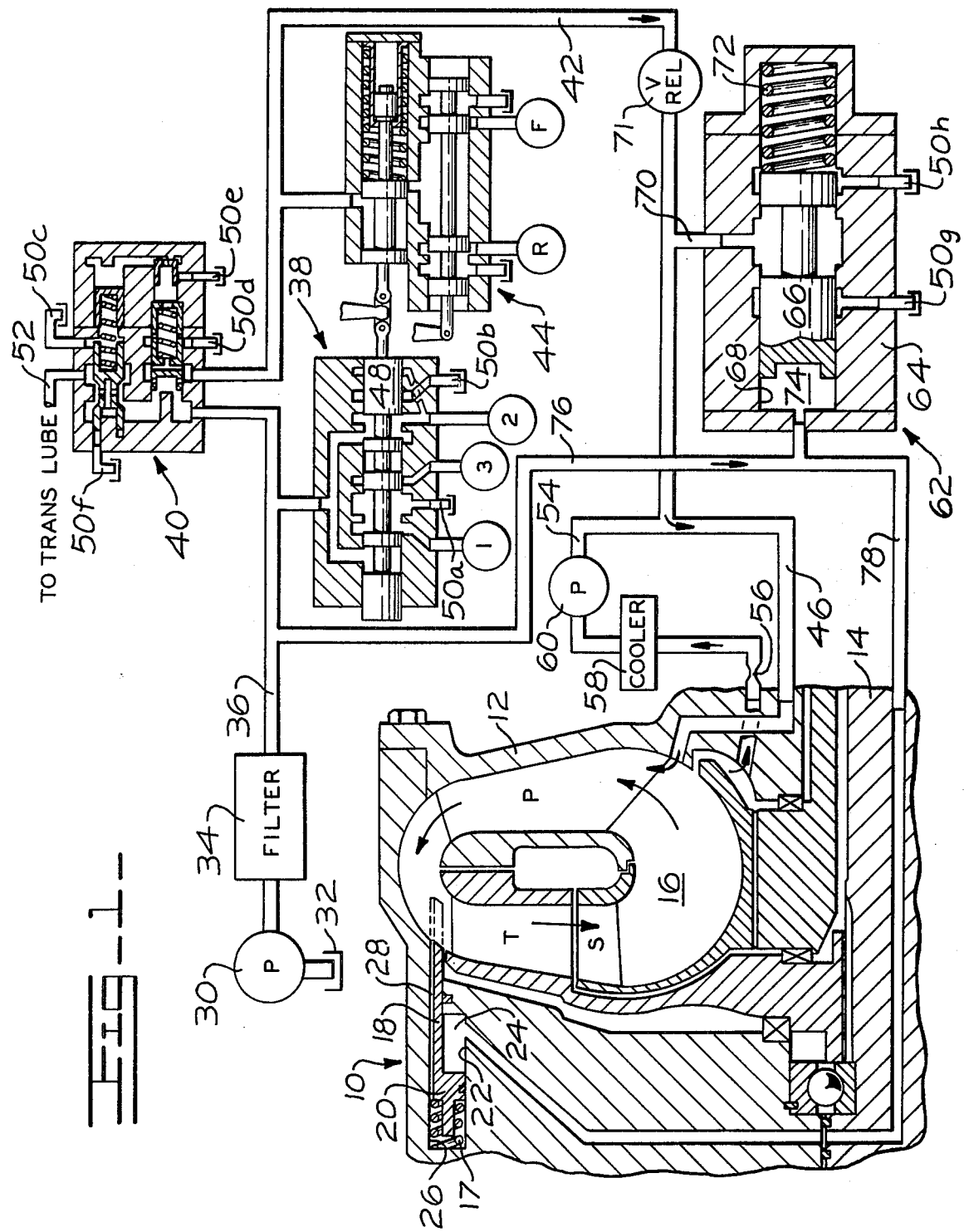
FIG. 1 is a schematic layout of a torque converter embodying the present invention.
Figure 2:
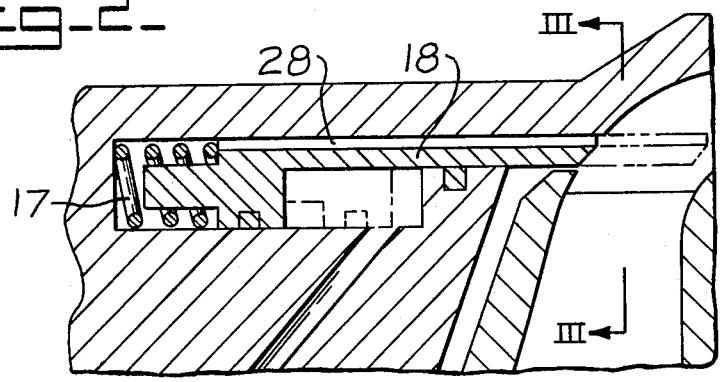
FIG. 2 is a detailed exploded view of a portion of a control means of the torque converter of FIG. 1.
Figure 3:
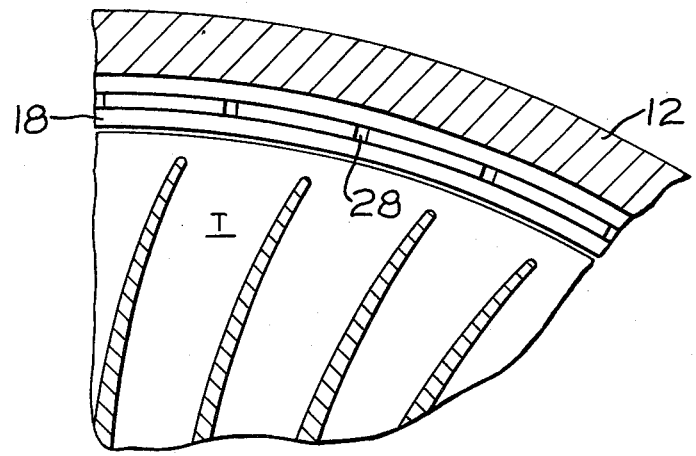
FIG. 3 is a section taken generally along lines 3—3 of FIG. 2.

Referring now to the drawings and more particularly to FIG. 1 there is illustrated a torque converter generally designated by the numeral 10, including a fluid control system all of which is used in combination with a multispeed transmission in an arrangement such as that disclosed in U.S. Pat. No. 3,021,729 entitled "Planetary Transmission for Tractors or the Like", issued Feb. 20, 1962 to Robert O. Chambers et al. and assigned to the assignee of the present invention. The torque converter is generally of conventional design having input means including an impeller P carried by rotatable housing 12 which encloses a stator S and a turbine T operatively connected to output means 14. The output means 14 is connected in a conventional manner to the drive means of a vehicle such as through a multispeed transmission (not shown). Typically fluid contained in chamber 16 circulates about as indicated by the arrows to transfer torque from the input impeller P to the turbine T. The present construction embodies control means comprising a spoiler 18 which is responsive to a signal such as a drop in clutch or brake actuating pressure for interrupting the circulation of fluid within the chamber 16. The spoiler 18 includes an annular piston 20 reciprocally mounted in an annular cylinder 22 formed in housing 12 and defining a pair of chambers 24 and 26. Pressurized fluid in chamber 24 normally maintains the spoiler 18 in the withdrawn or noninterfering position as illustrated. Pressurized fluid from chamber 16 communicates by way of a plurality of passageways or slots 28 with chamber 26 for actuating the spoiler 18 rightwardly into the interfering position shown in phantom when pressure in chamber 26 along with the load from a plurality of springs 17 exceeds the reduced pressure in chamber 24 during the period of a gear shift.

HYDRAULIC CONTROL SYSTEM

With reference still to FIG. 1 there is schematically illustrated the hydraulic control system utilized to selectively actuate the transmission drive train as well as to control simultaneously therewith the torque converter. A pump 30 operatively connected to be driven in a conventional manner from the engine (not shown) takes fluid from a supply sump 32 and supplies it under pressure through a filter 34 to a conduit 36. The conduit 36 conveys the fluid by way of branches to a selector control valve 38 and a pressure control valve 40. From the pressure control valve 40 the pressure then communicates with a conduit 42 which supplies fluid by way of branches to a directional safety valve 44 and to the torque converter inlet conduit 46.

Selector control valve 38 comprises a housing slidably mounting a spool 48. The valve is operative to selectively communicate fluid for the actuation of clutches and/or brakes 1, 2 and 3 and to drain conduits 50a and 50b.

The pressure control valve 40 is integrated into the system and arranged to communicate with the aforementioned conduits 36 and 42, with drain conduits 50c, 50d and 50e, and with transmission lubricant conduit 52. This entire control valve arrangement is more fully disclosed in U.S. Pat. No. 3,091,976 entitled "Hydraulic Controls for Power Transmission" and issued to Gordon W. Johnson et al, June 4, 1963.

The converter is provided with a charging circuit which includes a conduit 54 which includes an orifice 56 from which return fluid from the converter chamber 16 is conveyed through a cooler 58 by circulating pump 60 and thence to the converter inlet conduit 46. Fluid is supplied to this circuit by way of conduit 42 from the main supply pump 30. This charging circuit functions to keep the converter chamber 16 full of fluid and under a suitable pressure so as to function properly. The circuit also circulates the fluid through the cooler 58 in order to keep the fluid cooled down to a reasonable temperature. A dumping valve 62 included in this circuit dumps the fluid from the charger circuit back to the sump and thus relieves the pressure in chamber 16. This pressure reduction in the chamber results in reduced torque transfer through the converter. The dumping valve comprises a housing 64 having a spool 66 slidably mounted in a bore 68 and adapted to either open or close communication between an inlet conduit 70 and exhaust ports 50g or 50h. The spool is biased to the left by means of a spring 72 and is biased to the right by means of a pressure in chamber 74 and sensed by a conduit 76 from the main clutch actuating circuit conduit 36. A conduit 78 communicates fluid from circuit conduits 36 and 76 to chamber 24.

OPERATION

With the vehicle engine in operation, pump 30 will be driven to supply fluid to the control system through conduit 36 such that when selector control valve 38 is positioned as shown in FIG. 1 pressurized fluid will be supplied at clutch 2 at the speed clutch operating pressure as shown by line 80 in FIG. 5 at an indicated operating pressure of 315 P.S.I. Charging fluid will then pass along conduit 42 to the converter charging circuit through a differential relief valve 71 and then through conduits 54 and branch 46 into the chamber 16 at a converter inlet pressure as indicated by line 82 in FIG. 5. The outlet pressure from the chamber via the orifice 56 will be as indicated by line 84 in FIG. 5 as being approximately 100 P.S.I. Under these operating conditions the dumping valve 62 in response to a signal in the form of fluid pressure sensed along conduit 76 in chamber 74 moves spool 66 so that it will be positioned as shown to prevent exhausting of fluid entering the valve by way of conduit 70. At the same time, a signal by way of pressure conducted along line 78 in chamber 24 will move piston 20 and spoiler 18 all the way to the left as shown in FIG. 1 to its retracted position. Under these conditions the fluid in chamber 16 will be driven under the action of impeller P around in a torus flow path as shown by the arrows to thereby multiply and transmit torque to the turbine T which is then transmitted through a gear box to the driving wheels of the vehicle.

Upon shifting of the selector valve to a position for actuating another of the speed clutches the spool 48 will be moved such that the fluid from the clutch previously actuated will be directed to a drain (e.g., drains 50a or 50b). This drop in pressure in line 36 caused by filling the lines to a new speed clutch is sensed at dump valve 62 by a drop of pressure in chamber 74 thus permitting valve spool 66 to move leftward and thereby dumps fluid from the charging circuit conduit 54 as it enters the valve 62 by way of conduit or branch 70. This results in a drop in pressure in the charging circuit as shown in FIG. 5 by converter inlet pressure trace 82 and converter outlet pressure trace 84.

This drop in pressure is sensed by a drop in pressure in chamber 24 permitting springs 17 to move piston 20 rightwardly and extend a spoiler 18 into the converter chamber in the path of the flow of fluid therein. The movement of the spoiler 18 into the path of the fluid flow immediately causes a drop in the output torque of the converter as indicated in FIG. 4. With reference to FIG. 4 the normal torque output of the converter is indicated by line 86. This torque output immediately drops to a value indicated by line 88 upon actuation of the spoiler as described above. Thus, this control system is immediately responsive to a shift of the selector control valve to automatically reduce the torque output from the converter to provide a more even and smooth shifting of the vehicle both in a directional sense and in the speed changing ratio sense. Spoiler 18 and piston 20 stay in the right position as shown in phantom FIG. 1 until pressure in chamber 24 increases again as shown by speed clutch pressure 80 in FIG. 5 to approximately 290 P.S.I., then spoiler 18 will move leftwardly until completely retracted permitting complete circuit flow in chamber 16.

While a single embodiment of the invention has been illustrated and described it is to be understood that the present invention may be modified without departing from the spirit and scope thereof as defined by the appended claims.

What is claimed is:

1. A torque converter and control means therefor, said torque converter comprising power input means, at least one power output means, stator means and impeller means, means defining a fluid circulating circuit and in which a driven rotor is driven by a flow of pressure fluid impelled by said driving means, in combination with control means for a shiftable transmission comprising:

means responsive to said shiftable control means to interrupt said circulatory circuit and to relieve said converter of charging pressure.

2. The invention of claim 1 further comprising a charging circuit operatively connected to supply pressurized fluid to said circulatory circuit; and said means to relieve said converter of charging pressure comprises a dump valve.

3. The invention of claim 1 wherein said means to interrupt said circulatory circuit comprises an annular ring adapted to move into the path of said circuit.

4. The invention of claim 3 comprising a piston operatively connected to said annular ring.

5. The invention of claim 4 comprising means communicating pressurized fluid from a clutch actuating circuit to actuate said piston for retracting said spoiler ring.

6. The invention of claim 3 wherein said annular ring is carried by the impeller means.

7. In a torque converter and control means therefor, said torque converter including driving and driven rotors defining a fluid circulating circuit and in which the driven rotor is driven by a circulatory flow of pressure fluid impelled by the driving rotor, in combination with shiftable control means for a shiftable transmission comprising:

means responsive to control fluid pressure drop during shifting of said transmission to extend a spoiler ring into said circulatory circuit to interrupt the circulatory flow of fluid in said circuit, and;

valve means responsive to said control fluid pressure drop to rapidly relieve said converter of charging pressure.

* * * * *